(12) United States Patent
Carrillo et al.

(10) Patent No.: US 10,077,623 B2
(45) Date of Patent: Sep. 18, 2018

(54) VALVE WITH BALANCED BLIND SEAL RING

(71) Applicant: Cameron International Corporation, Houston, TX (US)

(72) Inventors: Kody Carrillo, Cypress, TX (US); Brian Matteucci, Houston, TX (US)

(73) Assignee: Cameron International Corporation, Houston, TX (US)

( * ) Notice: Subject to any disclaimer, the term of this patent is extended or adjusted under 35 U.S.C. 154(b) by 116 days.

(21) Appl. No.: 15/211,156

(22) Filed: Jul. 15, 2016

(65) Prior Publication Data

US 2018/0016861 A1 Jan. 18, 2018

(51) Int. Cl.
| | |
|---|---|
| *F16K 11/07* | (2006.01) |
| *E21B 33/06* | (2006.01) |
| *F16K 31/122* | (2006.01) |
| *F16K 27/00* | (2006.01) |
| *E21B 34/02* | (2006.01) |

(52) U.S. Cl.
CPC ............ *E21B 33/06* (2013.01); *E21B 33/063* (2013.01); *E21B 34/02* (2013.01); *F16K 27/003* (2013.01); *F16K 31/1221* (2013.01)

(58) Field of Classification Search
CPC ...... E21B 33/06; E21B 34/02; F16K 31/1221; F16K 27/003; F16K 11/07; F16K 11/0716; F16K 11/0787; Y10T 137/86879; Y10T 137/86702; Y10T 137/8667
See application file for complete search history.

(56) References Cited

U.S. PATENT DOCUMENTS

| | | | | |
|---|---|---|---|---|
| 3,215,163 A | * | 11/1965 | Henderson | F15B 13/0402 137/625.43 |
| 3,674,236 A | * | 7/1972 | Commarmot | F16K 3/02 251/176 |
| 3,917,220 A | | 11/1975 | Gilmore | |
| 4,444,216 A | * | 4/1984 | Loup | F16K 11/0655 137/115.15 |
| 4,450,869 A | * | 5/1984 | Acker | F16K 11/065 137/625.25 |
| 4,456,028 A | | 6/1984 | Watson | |
| 4,510,848 A | * | 4/1985 | Kast | F15B 13/0436 137/625.25 |
| 4,601,311 A | * | 7/1986 | Acker | F15B 13/0402 137/625.25 |

(Continued)

*Primary Examiner* — Marina Tietjen
(74) *Attorney, Agent, or Firm* — Helene Raybaud (57) ABSTRACT

Directional control valves with blind shear rings are provided. In one embodiment, a valve includes a piston within an inner chamber of a hollow body having inlet and outlet ports in fluid communication with the inner chamber. The valve includes a shear seal ring positioned in the piston and seated against an interior surface within the hollow body. The shear seal ring includes an interior cavity for allowing fluid communication between the inlet port and the outlet port via the interior cavity depending on the position of the piston. Further, the valve includes a blind ring positioned in the piston. At least a portion of the blind ring is exposed to fluid via the interior cavity of the shear seal ring, and the blind ring prevents flow of fluid from the interior cavity of the shear seal ring through the blind ring. Additional systems, devices, and methods are also disclosed.

19 Claims, 6 Drawing Sheets

(56) References Cited

U.S. PATENT DOCUMENTS

| | | | | |
|---|---|---|---|---|
| 4,856,557 A | * | 8/1989 | Watson | F16K 3/0209 |
| | | | | 137/625.25 |
| 5,459,953 A | * | 10/1995 | Fukano | F15B 13/0817 |
| | | | | 137/596.16 |
| 6,167,909 B1 | | 1/2001 | Davis | |
| 6,474,362 B1 | * | 11/2002 | Hope | E21B 34/04 |
| | | | | 137/625.64 |
| 7,000,890 B2 | | 2/2006 | Bell et al. | |

\* cited by examiner

VALVE WITH BALANCED BLIND SEAL RING

BACKGROUND

This section is intended to introduce the reader to various aspects of art that may be related to various aspects of the presently described embodiments. This discussion is believed to be helpful in providing the reader with background information to facilitate a better understanding of the various aspects of the present embodiments. Accordingly, it should be understood that these statements are to be read in this light, and not as admissions of prior art.

In order to meet consumer and industrial demand for natural resources, companies often invest significant amounts of time and money in finding and extracting oil, natural gas, and other subterranean resources from the earth. Particularly, once a desired subterranean resource such as oil or natural gas is discovered, drilling and production systems are often employed to access and extract the resource. These systems may be located onshore or offshore depending on the location of a desired resource.

Further, such systems generally include a wellhead assembly through which the resource is accessed or extracted. These wellhead assemblies may include a wide variety of components, such as various casings, valves, fluid conduits, blowout preventers, and the like, that control drilling or production operations. Control systems, such as subsea control pods, can be used to operate hydraulic components and manage flow through the assemblies. When a particular hydraulic function is to be performed (e.g., closing a ram of a blowout preventer), a control valve associated with the hydraulic function opens to supply control fluid to the component responsible for carrying out the hydraulic function (e.g., a piston of the blowout preventer). Control valves can also be used to control flow of various fluids in other applications.

SUMMARY

Certain aspects of some embodiments disclosed herein are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

Some embodiments of the present disclosure generally relate to a directional control valve having a shear seal ring and an opposing blind ring. In one embodiment, a valve includes a shear seal ring and a blind ring disposed in opposite ends of a bore of a moveable piston within a valve body. The shear seal ring moves with the piston and is biased against a seal plate to form a sliding seal. A supply inlet in the seal plate allows fluid to flow into the shear seal ring. The piston can be moved to position the shear seal ring so as to place the supply inlet in fluid communication with an outlet in the seal plate via the shear seal ring. This allows fluid to flow from the supply inlet to the outlet through an interior volume of the shear seal ring. The blind ring can be provided in the piston bore opposite the shear seal ring to balance transverse forces on the piston while preventing fluid from leaking out of the end of the piston bore opposite the supply inlet.

Various refinements of the features noted above may exist in relation to various aspects of the present embodiments. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. Again, the brief summary presented above is intended only to familiarize the reader with certain aspects and contexts of some embodiments without limitation to the claimed subject matter.

BRIEF DESCRIPTION OF THE DRAWINGS

These and other features, aspects, and advantages of certain embodiments will become better understood when the following detailed description is read with reference to the accompanying drawings in which like characters represent like parts throughout the drawings, wherein.

DETAILED DESCRIPTION OF SPECIFIC EMBODIMENTS

Specific embodiments of the present disclosure are described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time-consuming, but would nevertheless be a routine undertaking of design, fabrication, and manufacture for those of ordinary skill having the benefit of this disclosure.

When introducing elements of various embodiments, the articles "a," "an," "the," and "said" are intended to mean that there are one or more of the elements. The terms "comprising," "including," and "having" are intended to be inclusive and mean that there may be additional elements other than the listed elements. Moreover, any use of "top," "bottom," "above," "below," other directional terms, and variations of these terms is made for convenience, but does not require any particular orientation of the components.

Figure 1:
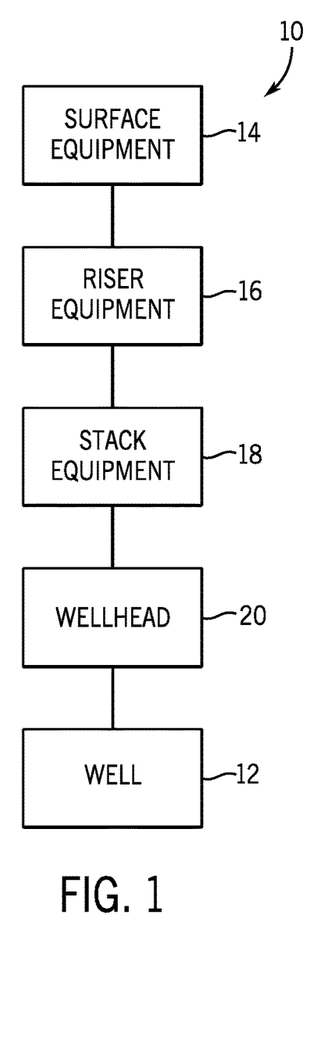
FIG. 1 generally depicts an offshore apparatus for accessing or extracting a resource, such as oil or natural gas, via a well in accordance with one embodiment of the present disclosure.

Turning now to the present figures, a well assembly or apparatus 10 is illustrated in FIG. 1 in accordance with one embodiment. The apparatus 10 (e.g., a drilling system or a production system) facilitates access to or extraction of a resource, such as oil or natural gas, from a reservoir through a well 12. The apparatus 10 is generally depicted in FIG. 1 as an offshore apparatus that includes surface equipment 14, riser equipment 16, and stack equipment 18 for accessing or extracting the resource from the well 12 via a wellhead 20. In one subsea drilling application, the surface equipment 14 is mounted to a drilling rig above the surface of the water, the stack equipment 18 (i.e., a wellhead assembly) is coupled to the wellhead 20 near the sea floor, and the riser equipment 16 connects the stack equipment 18 to the surface equipment 14. Although shown here as an offshore apparatus, the well apparatus 10 could instead be an onshore system in other embodiments.

The surface equipment 14 may include a variety of devices and systems, such as pumps, power supplies, cable and hose reels, control units, a diverter, a gimbal, a spider, and the like. Similarly, the riser equipment 16 may also include a variety of components, such as riser joints, flex joints, a telescoping joint, fill valves, and control units, to name but a few examples. The stack equipment 18, in turn, may include a number of components, such as blowout preventers and control systems, that enable control of fluid from the well 12.

Figure 2:
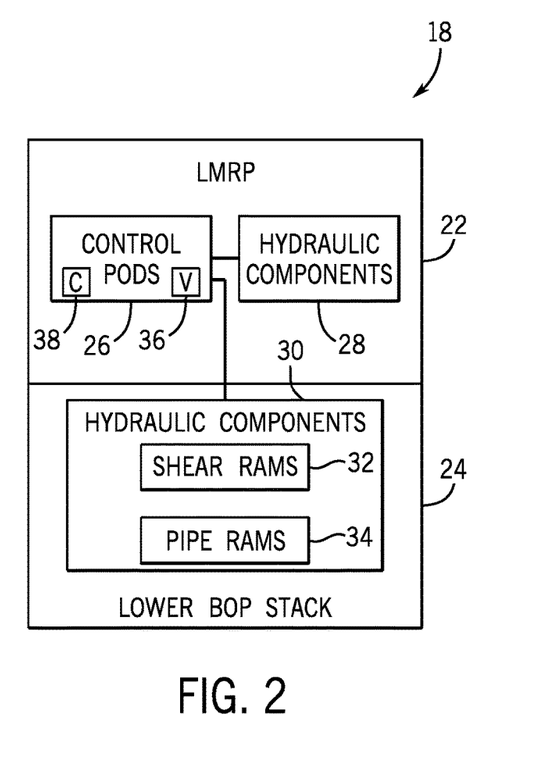
FIG. 2 is a block diagram of various components of stack equipment of the offshore apparatus of FIG. 1, including hydraulic components operated with control valves, in accordance with one embodiment.

In one embodiment generally depicted in FIG. 2, the stack equipment 18 includes a lower marine riser package (LMRP) 22 coupled to a lower blowout preventer (BOP) stack 24. The lower marine riser package 22 includes a control system, provided in the form of control pods 26 in FIG. 2, for controlling hydraulic components 28 and 30. The components 28 and 30 perform various hydraulic functions on the stack equipment 18, including controlling flow from the well 12 through the stack equipment 18. In the depicted embodiment, the components 30 of the lower blowout preventer stack 24 include hydraulically controlled shear rams 32 and pipe rams 34 (of ram-type blowout preventers). But it will be appreciated that the stack equipment 18 may include many hydraulic functions that would be performed by the hydraulic components 28 and 30. By way of example, in various embodiments the hydraulic components 28 and 30 collectively include annular blowout preventers, other ram-type blowout preventers, and other valves.

The control pods 26 are connected to the components 28 and 30 by suitable conduits (e.g., control tubing or hoses). This allows the control pods 26 to route hydraulic control fluid to the components 28 and 30 to cause these components to perform their intended functions, such as closing the rams of a blowout preventer or opening a valve. The hydraulic control fluid may be routed to the components 28 and 30 via control valves 36 operated by a controller 38. In at least some embodiments, the control pods 26 include directional control valves 36 mounted on shared subplates or manifolds, and the controller 38 includes a subsea electronics module that controls operation of the valves 36 based on received command signals.

Figure 3:
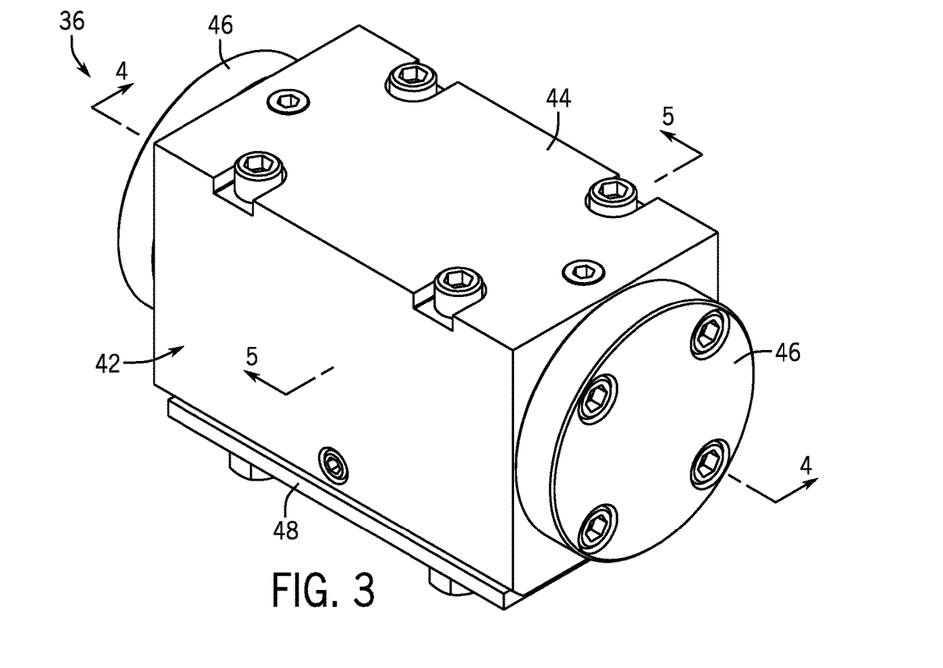
FIG. 3 is a perspective view of a directional control valve in accordance with one embodiment.
Figure 4:
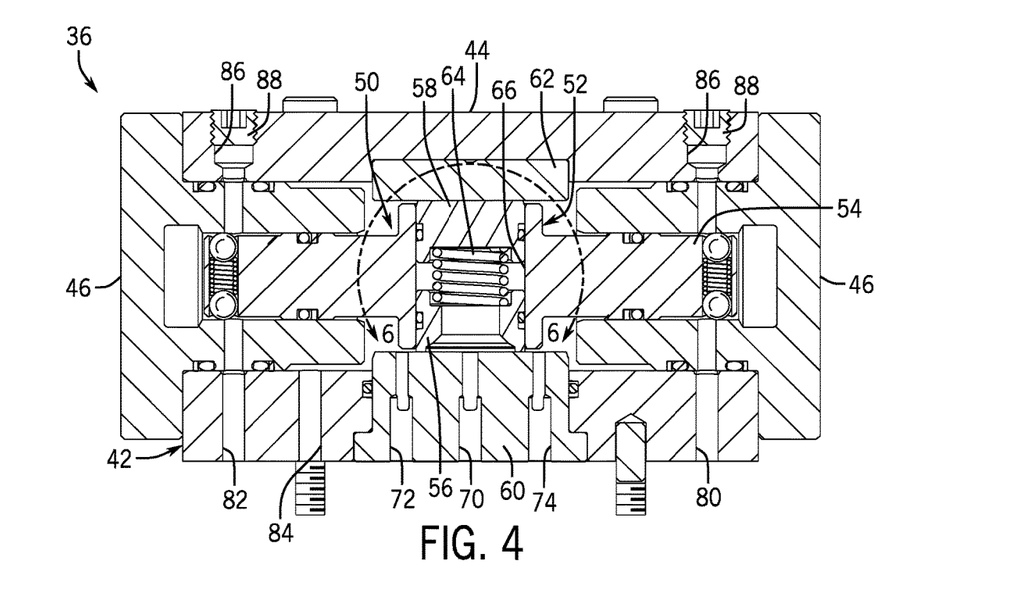
FIGS. 4 and 5 are cross-sections of the control valve of FIG. 3 and show a shear seal ring and a blind ring disposed within a piston inside the valve in accordance with one embodiment.
Figure 5:
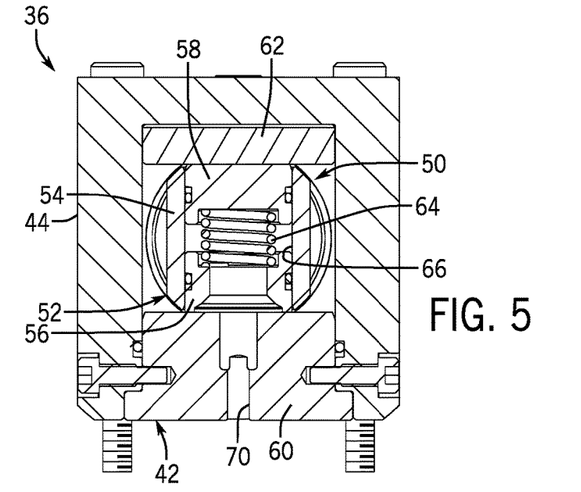

An example of a directional control valve 36 is illustrated in FIGS. 3-5 in accordance with one embodiment. The depicted control valve 36 includes a hollow body 42 having a main body 44 and end caps 46. A control valve 36 can be provided as a subplate mounted valve, and the valve 36 in FIG. 3 is accordingly shown mounted on a plate 48 with fasteners (i.e., bolts extending through the main body 44 and the plate 48 with mating nuts below the plate 48). Although shown in FIG. 3, the plate 48 and the nuts have been omitted from FIGS. 4 and 5 for simplicity.

As shown in FIGS. 4 and 5, the hollow body 42 includes an inner chamber 50 for receiving a moveable carriage assembly 52. To facilitate installation, the carriage assembly 52 can be inserted through an end of the main body 44, and the end caps 46 can be attached to the main body 44 so to enclose the carriage assembly 52 within the hollow body 42. The depicted assembly 52 includes a carriage 54 carrying a shear seal ring 56 and a blind shear ring 58. Reciprocal movement of the carriage 54 within the inner chamber 50 along a longitudinal path between the end caps 46 allows the shear seal ring 56 to be selectively moved to control flow of a fluid (e.g., a hydraulic control fluid) through the valve 36, as described in greater detail below. While the carriage 54 is depicted as a hydraulically actuated piston in FIGS. 4 and 5, the carriage 54 could take different forms in other embodiments (e.g., a solenoid-actuated carriage).

The shear seal ring 56 seats and seals against a shear seal plate 60, which is shown in FIGS. 4 and 5 as part of the hollow valve body 42. More particularly, the depicted seal plate 60 is positioned within in an aperture of the main body 44 and secured by fasteners. The blind ring 58 is shown in FIGS. 4 and 5 as being seated against a blind plate 62. A spring 64 is positioned between the shear seal ring 56 and the blind ring 58 within a bore 66 of the carriage 54, and this spring 64 biases the shear seal ring 56 and the blind ring 58 outwardly from the carriage 54. Although other arrangements are also envisaged, in the presently depicted embodiment the bore 66 extends through the carriage 54 perpendicular to the direction of reciprocal movement of the carriage 54, and the spring 64 biases the shear seal ring 56 and the blind ring 58 outwardly from the piston in opposite directions.

In the presently depicted embodiment, the seal plate 60 includes ports 70, 72, and 74 for allowing fluid to enter and exit the valve 36. During valve operation, reciprocal movement of the carriage 54 within the inner chamber 50 (i.e., along a longitudinal path between the end caps 46) enables the shear seal ring 56 to be selectively moved (while maintaining a sliding seal with the seal plate 60) to allow fluid communication between the port 70 and either of the ports 72 or 74. In at least some instances, the port 70 is an inlet port and the ports 72 and 74 are outlet ports. In such cases, control fluid (or some other fluid) can be routed into the valve 36 through the inlet port 70 and selectively routed out of the valve 36 via the outlet port 72 or 74 through appropriate movement of the carriage 54 and shear seal ring 56.

The outlet ports 72 and 74 may be connected to one or more downstream devices (e.g., hydraulic components 28 or 30) to facilitate control of different functions of such devices, and that a given function can be activated by routing control fluid from the valve 36 through the outlet port 72 or 74. The hollow body 42 of the valve 36 shown in FIG. 4 includes ports 80 and 82 that allow hydraulic pilot pressure to be used to control movement of the carriage 54 and, consequently, flow from the inlet port 70 to either the outlet port 72 or the outlet port 74. The hollow body 42 also includes various additional ports, such as a vent port 84 and ports 86 that can be used to facilitate purging (or bleeding) of the pilot fluid injected through ports 80 and 82 for controlling the position of the carriage 54. Screws 88 can be used to seal the ports 86, as shown in FIG. 4, but these screws 88 can be removed (and in at least some instances replaced by valves) for purging or bleeding.

Figure 6:
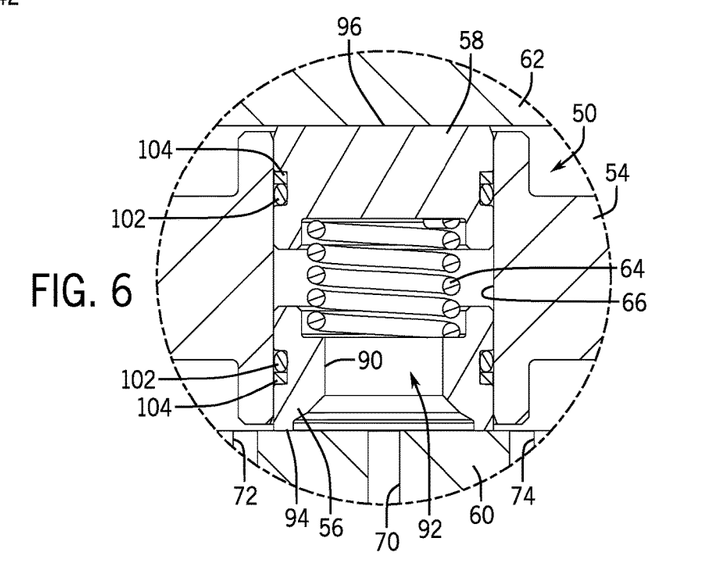
FIG. 6 is a detail view of the shear seal ring and the blind ring of FIGS. 4 and 5 within the piston.

The shear seal ring 56 and the blind ring 58 of FIGS. 4 and 5 are shown in greater detail in FIG. 6. The shear seal ring 56 includes an inner surface 90 that defines a bore or interior cavity 92. The spring 64 biases the shear seal ring 56 against the seal plate 60 to maintain a seal between an end surface 94 of the shear seal ring 56 and the seal plate 60. In at least some embodiments, the shear seal ring 56 and the seal plate 60 are metallic components and, thus, the seal between these components is a metal-to-metal sliding seal. In use, fluid enters the interior cavity 92 of the shear seal ring 56 from the inlet port 70, and the pressure of this fluid can further bias the shear seal ring 56 against the seal plate 60. The seal between the seal plate 60 and the end surface 94 of the shear seal ring 56 prevents leakage of the fluid out of the cavity 92 along the seal plate 60.

Figure 7:
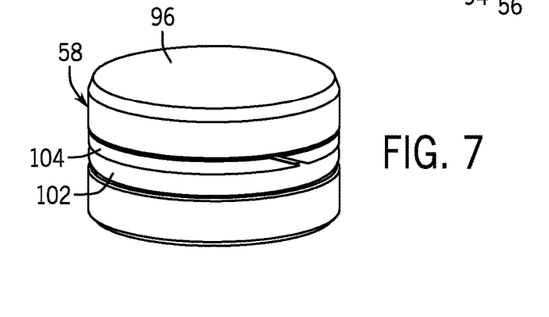
FIG. 7 is a perspective view of the blind ring of FIGS. 4-6 in accordance with one embodiment.

The blind ring 58, which is depicted in greater detail in FIG. 7, is biased radially outward by the spring 64 such that an end surface 96 of the blind ring 58 bears against the blind plate 62. Pressure from fluid received through the interior cavity 92 of the shear seal ring 56 can also bias the blind ring 58 radially outward. The blind ring 58 is used to offset and balance radial forces acting on the carriage 54 (i.e., forces perpendicular to the axis of motion of the carriage 54). In some other designs, an additional shear seal ring (e.g., a second seal ring 56) is used in place of the blind ring 58, and this additional shear seal ring would seat and seal against the plate 62 in a manner similar to how the shear seal ring 56 seats and seals against the seal plate 60. In at least some instances, the valve 36 is retrofitted by replacing one of a pair of shear seal rings with the blind ring 58. For this reason, the blind ring 58 can be referred to as a blind seal ring and the plate 62 can be referred to as a blind seal plate. But it will be appreciated that the blind ring 58 and the plate 62 do not have to seal against one another during operation. That is, unlike an additional shear seal ring that would have to seal against a seal plate to prevent leakage of fluid out of the additional shear seal ring along the seal plate, the body of the blind ring 58 prevents the flow of fluid from the interior cavity 92 of the shear seal ring 56 to the plate 62 through the blind ring 58 and eliminates a leak path from the ring 58 along the plate 62. Consequently, the use of the blind ring 58 in place of a second shear seal ring can reduce the supply fluid leakage rate out of the bore 66 by nearly fifty percent (by eliminating a second sliding seal between the plate 62 and a second shear seal ring). The depicted shear seal ring 56 and blind ring 58 also have grooves for receiving seals 102 (e.g., o-rings) and back-up rings 104 for preventing fluid leakage from the bore 66 of the carriage 54 along the outer surfaces of the rings 56 and 58.

Figure 8:
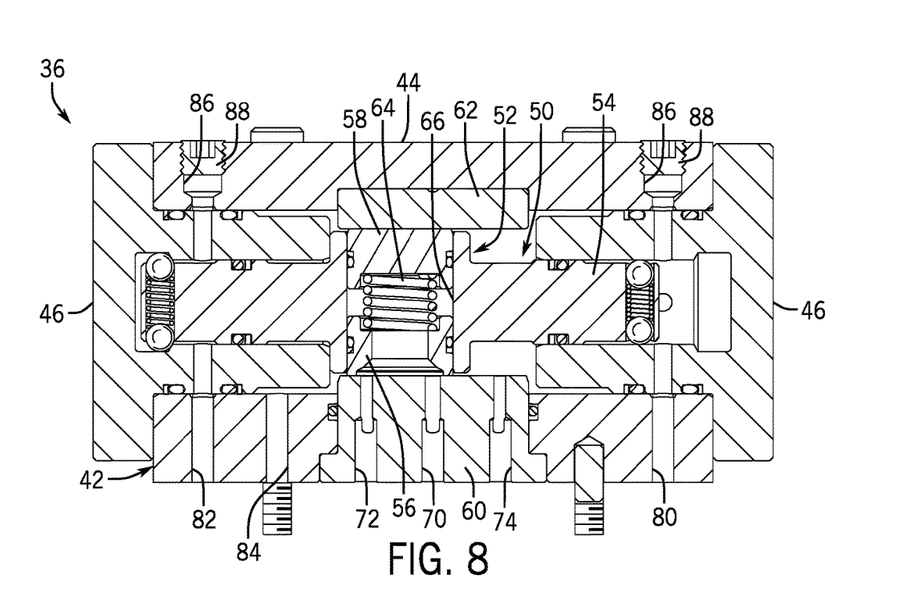
FIGS. 8 and 9 generally depict positioning of the piston and the shear seal ring so as to allow flow from an inlet port to either of two outlet ports through an interior of the shear seal ring in accordance with one embodiment.
Figure 9:
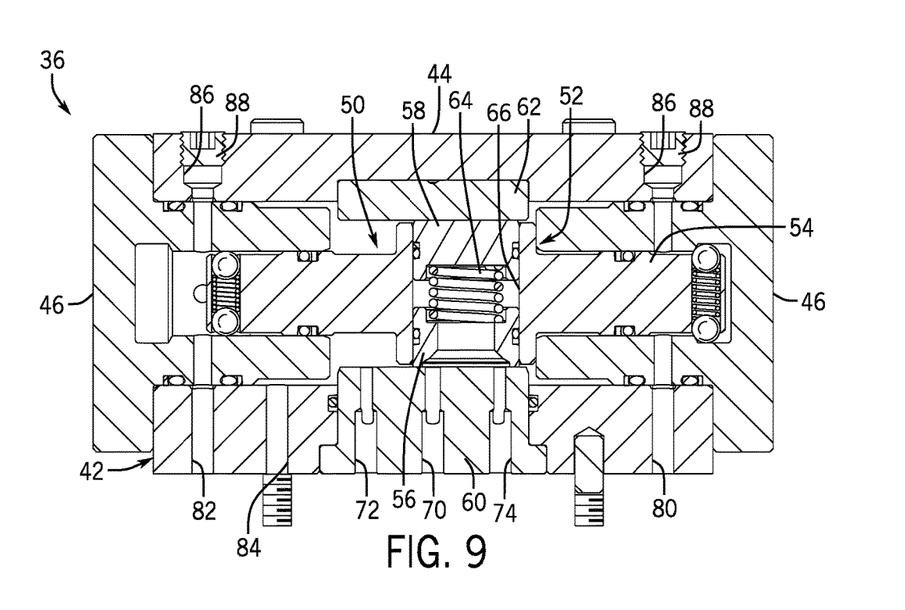

The interior cavity 92 of the shear seal ring 56 is sized to selectively allow fluid to flow from the inlet port 70 to one of the outlet ports 72 or 74. More specifically, the carriage 54 can be moved to position the shear seal ring 56 above both the inlet port 70 and either the outlet port 72 (as shown in FIG. 8) or the outlet port 74 (as shown in FIG. 9). This allows fluid to flow into the interior cavity 92 from the inlet port 70 and then out of the interior cavity 92 through either of the outlet ports. For instance, pilot pressure can be applied to the valve 36 via the port 80 to move the carriage 54 and the carried shear seal ring 56 so as to connect the inlet port 70 with the outlet port 72 via the interior cavity 92 of the shear seal ring 56, as depicted in FIG. 8. Similarly, pilot pressure can be applied via the port 82 to move the carriage 54 and the shear seal ring 56 in the opposite direction such that the interior cavity 92 of the shear seal ring 56 places the inlet port 70 in fluid communication with the outlet port 74, as shown in FIG. 9.

Figure 10:
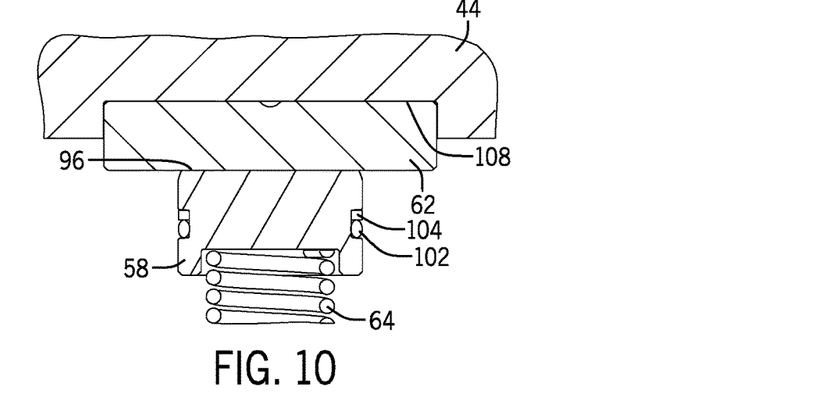
FIG. 10 depicts a blind ring biased against a blind plate in a recess of a valve body in accordance with one embodiment.
Figure 11:
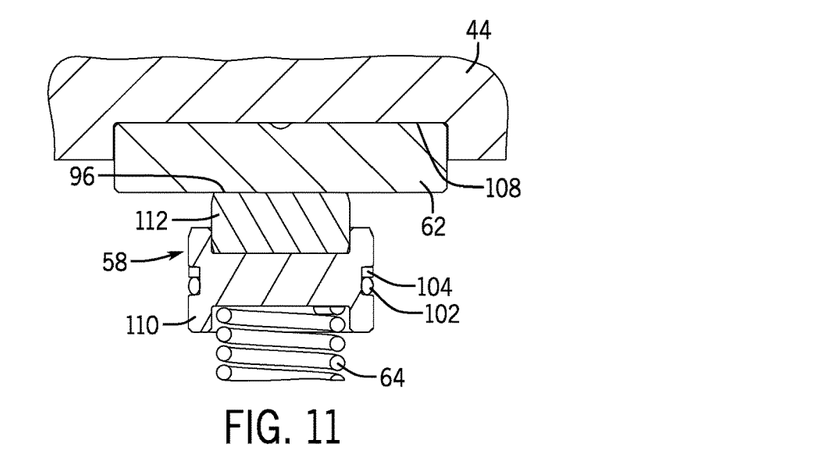
FIG. 11 depicts a blind ring as having a wear pad for sliding engagement with a blind plate in accordance with one embodiment.
Figure 12:
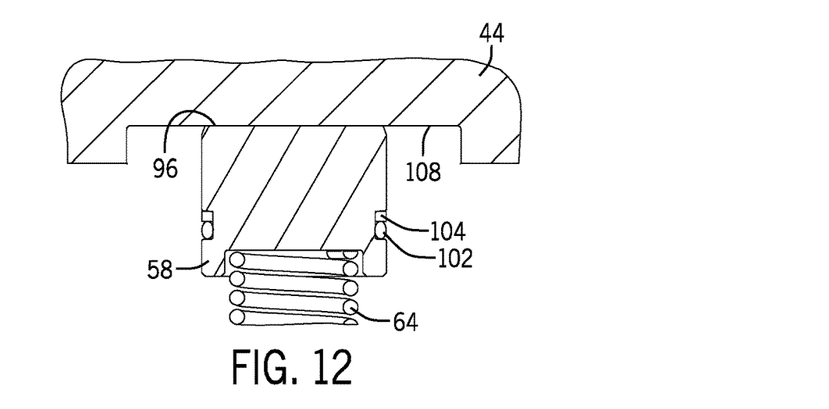
FIG. 12 shows a blind ring biased directly against a valve body, rather than against a blind plate received in the body, in accordance with one embodiment.

Detail views of various blind rings 58 and abutting surfaces are depicted in FIGS. 10-12 in accordance with certain embodiments. The carriage 54 and various other surrounding components are omitted from these figures for clarity, but it will be appreciated that the various blind rings 58 depicted in FIGS. 10-12 could be used with the carriage 54 in a valve 36. The bodies of the blind rings 58 can be formed of any suitable materials, examples of which include tungsten carbide, stainless steel, or polymer (e.g., polyetheretherketone (PEEK), polyoxymethylene (POM), or ultra-high-molecular-weight polyethylene (UHMWPE)).

In FIG. 10, the blind ring 58 is biased against a blind plate 62 received in a recess 108 of the valve main body 44. Like the blind rings 58, blind plates 62 can be formed of any suitable materials. For instance, a blind plate 62 can be made of tungsten carbide, stainless steel, or a nickel-aluminum-copper alloy. During movement of the carriage 54, the end surface 96 of the blind ring 58 slides along the blind plate 62. In certain embodiments, the blind ring 58 or the blind plate 62 includes a coating, such as a polytetrafluoroethylene (PTFE) coating, for reducing friction or decreasing wear. In some other instances, PTFE or some other polymer is added to the material used in forming the blind ring 58 or the blind plate 62 to reduce friction or increase wear-resistance. In still other instances, a blind ring 58 can include roller bearings to facilitate transverse movement of the blind ring 58 along the blind plate 62 (or any other abutting surface).

In another embodiment generally depicted in FIG. 11, the blind ring 58 includes a carrier 110 holding a wear pad 112. The spring 64 biases the blind ring 58 toward the blind plate 62 (or some other bearing surface), as noted above. In the presently depicted embodiment, the end surface 96 of the blind ring 58 is on the wear pad 112, which slides along the blind plate 62 during movement of the carriage 54. As with the other blind rings 58 described above, the carrier 110 and the wear pad 112 may be formed of any suitable materials. In at least some embodiments, the carrier 110 and the wear pad 112 are formed of different materials, such as the carrier 110 having a metallic body and the wear pad 112 having a polymeric body. The wear pad 112 can include a coating or a body with PTFE or some other material for reducing friction or wear. In another embodiment, the wear pad 112 is provided with or as roller pads to facilitate movement of the blind ring 58 during operation of the valve 36.

Although certain embodiments are described above as having a blind ring 58 that slides along a blind plate 62, it is also noted that the blind plate 62 could be omitted and that the blind ring 58 could slide along some other interior surface of the valve 36, such as along a surface of the main body 44. For example, the blind ring 58 depicted in FIG. 12 is biased directly against the main body 44 in the recess 108. During movement of the carriage 54, the end surface 96 of the blind ring 58 slides along the main body 44. Compared to the blind ring 58 of FIG. 10, the blind ring 58 of FIG. 12 has an increased height to compensate for the omission of a blind plate 62 in the recess 108. In one embodiment, an existing valve 36 having a blind plate 62 in a recess 108 and a second shear seal ring that seals against the blind plate 62 could be retrofitted by removing the blind plate 62 from the valve 36 and substituting a blind ring 58 (such as the blind ring 58 of FIG. 12) for the second shear seal ring. In some other instances, a valve 36 can include a main body 44 without a blind plate recess 108 and a blind ring 58 that bears against another inner surface of the main body 44. In at least one embodiment, that inner surface of the main body 44 is a curved surface (e.g., the interior bore wall defining the inner chamber 50) and the end surface 96 of the blind ring 58 is similarly curved to facilitate sliding movement of the blind ring 58 across the curved inner surface of the main body 44.

Figure 13:
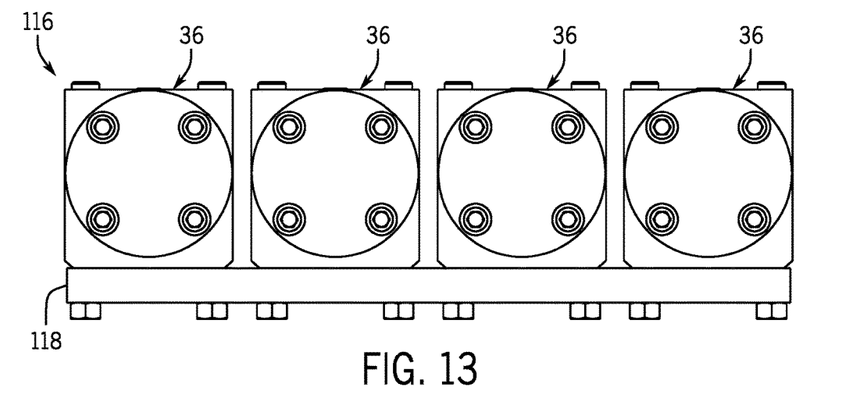
FIG. 13 generally depicts a valve assembly having valves mounted on a connection plate in accordance with one embodiment.
Figure 14:
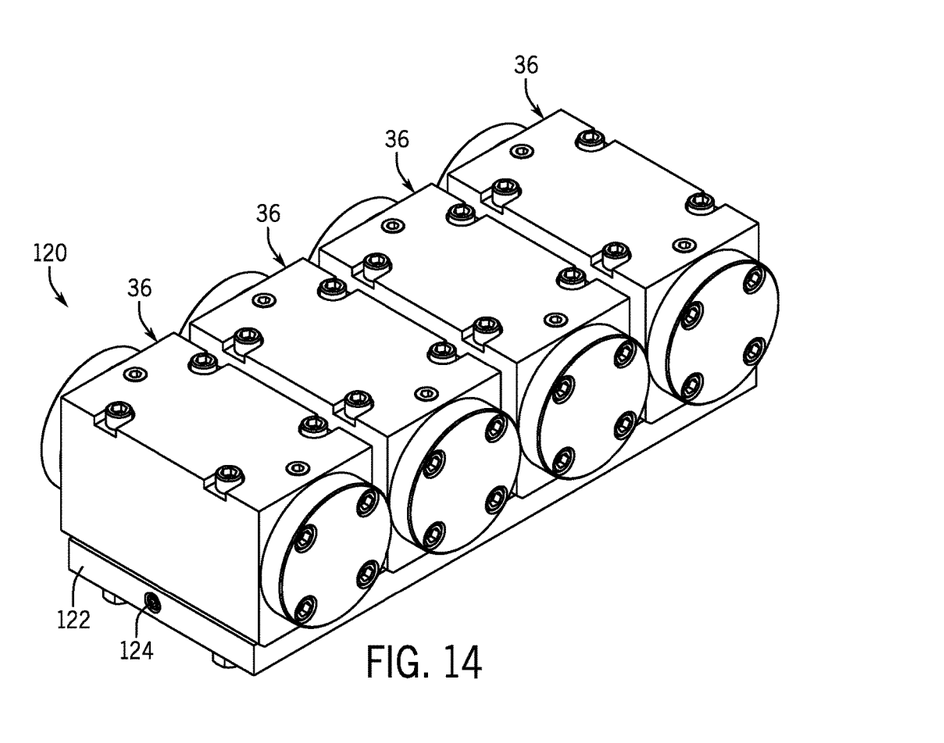
FIG. 14 generally depicts a valve assembly having valves mounted on a manifold in accordance with one embodiment.

Finally, it will be appreciated that the valves 36 can be mounted in various arrangements. For instance, a valve assembly 116 is depicted in FIG. 13 as having valves 36 mounted on a connection plate 118, which can have various connections to facilitate coupling of ports on the bottom of the valves 36 (e.g., inlet port 70, outlet ports 72 and 74, pilot pressure ports 80 and 82, and vent port 84) to control tubing or hoses for routing fluid to and from the valves 36. In another instance, a valve assembly 120 includes valves 36 mounted on a manifold 122 having a common supply line 124 that can be used to route control fluid to the inlet ports 70 of the valves 36. The manifold 122 can also include other connections to facilitate coupling of other ports of the valves 36 to other components via control tubing or hoses.

While the aspects of the present disclosure may be susceptible to various modifications and alternative forms, specific embodiments have been shown by way of example in the drawings and have been described in detail herein. But it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. An apparatus comprising:
 a valve including:
  a hollow body having an inlet port and an outlet port in fluid communication with an inner chamber of the hollow body;
  a piston disposed within the inner chamber of the hollow body;
  a shear seal ring positioned in the piston and seated against an interior surface within the hollow body, wherein the shear seal ring includes an interior cavity sized to permit the interior cavity to be positioned simultaneously over the inlet port and over the outlet port to selectively allow fluid communication between the inlet port and the outlet port via the interior cavity depending on the position of the piston within the inner chamber of the hollow body; and
  a blind ring positioned in the piston, wherein at least a portion of the blind ring is exposed to fluid via the interior cavity of the shear seal ring and the blind ring prevents flow of fluid from the interior cavity of the shear seal ring through the blind ring.

2. The apparatus of claim 1, wherein the hollow body includes a seal plate having the inlet port, the outlet port, and the interior surface against which the shear seal ring is seated.

3. The apparatus of claim 2, comprising a blind plate, wherein the blind ring is seated against the blind plate.

4. The apparatus of claim 2, wherein the hollow body includes a main body in which the seal plate is received.

5. The apparatus of claim 4, wherein the hollow body includes end caps fastened to the main body so as to enclose the inner chamber of the hollow body.

6. The apparatus of claim 4, wherein the blind ring contacts the main body in which the seal plate is received.

7. The apparatus of claim 1, wherein the piston includes a bore in which both the shear seal ring and the blind ring are positioned.

8. The apparatus of claim 7, comprising a spring positioned between the shear seal ring and the blind ring so as to bias the shear seal ring and the blind ring outwardly from the piston in opposite directions.

9. The apparatus of claim 1, wherein the hollow body includes an additional outlet port positioned such that the shear seal ring can be moved by the piston within the inner chamber of the hollow body to selectively allow fluid communication between the inlet port and the additional outlet port.

10. The apparatus of claim 1, wherein the blind ring includes a wear pad and a carrier.

11. An apparatus comprising:
 a directional control valve including:
  a hollow body having an inlet port and an outlet port; and
  a carriage assembly that includes shear rings and is received in the hollow body so as to allow reciprocal movement of the carriage assembly within the hollow body, wherein the shear rings include a shear seal ring that is biased toward and seals against an internal surface within the directional control valve and a blind shear ring that is biased toward and contacts a different internal surface within the directional control valve, and the shear seal ring includes an interior cavity sized to permit the interior cavity to be positioned simultaneously over the inlet port and over the outlet port to selectively allow fluid communication between the inlet port and the outlet port via the interior cavity.

12. The apparatus of claim 11, wherein the directional control valve includes a shear seal plate and the internal surface within the directional control valve against which the shear seal ring seals includes a surface of the shear seal plate.

13. The apparatus of claim 11, wherein the carriage assembly includes a hydraulic piston.

14. The apparatus of claim 11, wherein the directional control valve is mounted on a subplate or on a manifold along with one or more additional directional control valves that each include:
 a hollow body; and
 a carriage assembly that includes shear rings and is received in the hollow body so as to allow reciprocating movement of the carriage assembly within the hollow body, wherein the shear rings include a shear seal ring that is biased toward and seals against an internal surface within the directional control valve and a blind shear ring that is biased toward and contacts a different internal surface within the directional control valve.

15. The apparatus of claim 11, comprising a blowout preventer control system including the directional control valve.

16. A method comprising:
 receiving a control fluid within a bore of a piston of a control valve, wherein receiving the control fluid within the bore of the piston includes receiving the control fluid within a bore of a shear seal ring positioned in a first end of the bore of the piston;

preventing flow of the control fluid out of a second end of the bore of the piston with a blind ring positioned in the second end of the bore of the piston; and moving the piston of the control valve such that the shear seal ring slides along a seal plate and overlaps both an inlet port of the control valve and a first outlet port of the control valve so as to place the inlet port of the control valve in fluid communication with the first outlet port of the control valve via the bore of the shear seal ring.

17. The method of claim 16, comprising moving the piston of the control valve such that the shear seal ring slides along the seal plate and places the inlet port of the control valve in fluid communication with a second outlet port of the control valve via the bore of the shear seal ring.

18. The method of claim 16, wherein the blind ring contacts an inner surface of a hollow body of the control valve rather than a blind seal plate, and moving the piston of the control valve causes the blind ring to slide along the inner surface of the hollow body.

19. The method of claim 18, wherein the blind ring and the inner surface of the hollow body include mating curved surfaces, and moving the piston of the control valve causes the curved surface of the blind ring to slide along the curved surface of the hollow body.

* * * * *